United States Patent

[11] 3,616,046

| [72] | Inventors | James R. Benzinger<br>Orchard Park;<br>Harold D. Marshall, Tonawanda, both of N.Y. |
|---|---|---|
| [21] | Appl. No. | 735,562 |
| [22] | Filed | June 10, 1968 |
| [45] | Patented | Oct. 26, 1971 |
| [73] | Assignee | Spaulding Fibre Company, Inc.<br>Tonawanda, N.Y. |

[54] METHOD OF LAMINATING WITH ANILINE-PHENOLIC RESOLE
1 Claim, No Drawings

| [52] | U.S. Cl. | 156/331,<br>156/335, 260/29.3, 260/51.5 |
|---|---|---|
| [51] | Int. Cl. | C09j 3/16 |
| [50] | Field of Search | 156/335,<br>331; 117/155 L; 260/29.3, 51.5 |

[56] References Cited

UNITED STATES PATENTS

| 2,482,499 | 9/1949 | Nogel | 117/76 |
|---|---|---|---|
| 2,561,449 | 7/1951 | Ruderman | 260/51.5 X |
| 3,024,156 | 3/1962 | Seiler | 156/314 |
| 3,044,895 | 7/1962 | Isaacson | 117/60 |
| 3,471,443 | 10/1969 | Bornstein | 260/56 |

FOREIGN PATENTS

| 569,038 | 1/1959 | Canada | 260/29.3 |
|---|---|---|---|

*Primary Examiner*—Carl D. Quarforth
*Assistant Examiner*—E. A. Miller
*Attorney*—Bean & Bean

ABSTRACT: A laminated product possessing good physical and electrical properties made with an impregnating resin which is a reaction product of aniline, phenol and formaldehyde. These resins impart unusually good electrical and physical properties to the laminated product and are sufficiently water soluble as to allow their water content to be adjusted for direct, one stage impregnation of cellulose fiber materials such as paper.

3,616,046

METHOD OF LAMINATING WITH ANILINE-PHENOLIC RESOLE

BACKGROUND OF THE INVENTION

Many types of products are manufactured by impregnating sheets of fibrous materials with one of various synthetic thermosetting resins, partially curing the impregnated material, laminating such sheets and finally curing the laminate under heat and pressure. The partial cure conventionally is referred to as "B" stage whereas the final cure is referred to as "C" stage.

As stated, many products are obtained in this general fashion, the requisite physical or other properties of the product being controlled by choice of resin and base material. For example, products which require certain electrical properties, unusual physical properties or a combination thereof have conventionally required the use of phenolic resins applied to various base materials including paper, natural fiber materials, or synthetic fiber materials. In particular, cresylic acid formaldehyde resin is used and whereas the use of this resin imparts unusually good electrical and physical properties to the laminated product, the resin is periodically in short supply.

Moreover, when this resin is used in conjunction with paper base material, it is necessary to effect impregnation in two steps or stages for best electrical properties. The reason for this is that the cellulose fibers require the presence of water during impregnation to assure that the fibers are wetted and swelled for reception and penetration of the resin thereinto. The phenolic resin, being water insoluble, must give way to an initial impregnation by a suitable water soluble low molecular weight phenolic resin which is then partially cured, followed by a second impregnation stage which usually involves a phenolic resin.

BRIEF SUMMARY OF THE INVENTION

This invention is directed to a novel resin for use in the manufacture of laminated products of the type specified above, and to the products so obtained.

Specifically, the invention relates to a resin which is the reaction product of aniline, phenol and formaldehyde which is capable of producing laminated products possessing unusually good physical and/or electrical properties, and which resin is further capable of allowing single step impregnation of paper base materials.

The single step impregnation of paper base materials evolves from the fact that the resin is sufficiently water soluble and of molecular size as to permit its water content to be adjusted to a level which adequately wets and swells cellulose fibers and thus allows the resin to penetrate and impregnate such fibers. Alternatively, the water content may be adjusted downwardly and the resin used to impregnate other fibrous materials as, for example, synthetic fibrous materials.

Another object of this invention is to provide a NEMA (National Electrical Manufacturers Association)XXXP laminate with an unusual combination of properties which in addition to conforming to all of NEMA XXXP requirements has flame retardance, good arc resistance, is noncorrosive to silver, has very good 60 cycle dissipation factor, unusually good cold flow, cold flow plus shrinkage, and good fabricating properties.

A further object of this invention is the preparation of natural and synthetic fabric base laminates from the resin of this invention which are stronger than conventional phenolic laminates, have distinctly improved dimensional stability to water, to heat, and better electrical properties. These properties are of special interest to the military and to motor pump manufacturers.

Still another object of this invention is to provide tubing prepared from the resin of this invention which exhibits very low 60 cycle power factor values at elevated as well as room temperatures. The same properties are found as well in the sheet forms of the laminate and are of interest as electrical insulation to manufacturers of power transformers and related equipment.

DETAILED DESCRIPTION OF THE INVENTION

The resin according to this invention may be obtained by reacting aniline, phenol and formaldehyde. The reaction may proceed with or without the presence of a basic catalyst although the use of catalyst is preferred. More particularly, it has been found that successful resins may be prepared by reacting 2 moles of aniline, from 5 to 28 moles of phenol and from 7 to 30 moles of formaldehyde in the presence of basic catalysts such as ammonia, triethanolamine and sodium hydroxide, the preferred molar ratio of aniline, phenol and formaldehyde being 2-7-10.5. After reaction, solvent such as isopropyl alcohol, acetone or the like is added to provide about 50% total solids content for impregnation purposes. If the material to be impregnated is a cellulose fiber product, water content is adjusted to 7-15%, whereupon the cellulose fiber material may be impregnated readily in a single step followed by "B" stage curing prior to production of the "C" stage product.

A preferred resin composition and method of making it is as follows:

EXAMPLE 1

20 parts by weight of aniline, 70 parts by weight of phenol and 90 parts by weight of 37 percent formalin together with 3 parts by weight of aqueous ammonia, 26° Baume, were reacted in a resin kettle by refluxing at 212° F. with stirring. After about one hour of refluxing, heating and agitation were terminated and the resinous layer separated from the aqueous layer. To the resinous layer was added isopropyl alcohol in an amount sufficient to bring the total solids content to about 50 percent. For impregnation of cellulose fiber materials, the water content is adjusted between 9 percent and 12 percent, whereas when used to impregnate synthetic fiber materials, the water content may be adjusted to below 9 percent. The specified range of 9–12 percent represents the upper extent of the water solubility of this resin, and is sufficient to wet and swell cellulose fibers and insure penetration of the resin thereinto.

EXAMPLE 2

The resin composition of example 1 was used to saturate 0.015 inch thick cotton linter paper to a resin content of 60 percent. The impregnated paper was cured to "B" stage by oven heating at a temperature of 320° F. for 2 ½ minutes. A laminate was formed by plying up the "B" stage sheets and curing to "C" stage by subjecting them to a pressure of 1,500 p.s.i. at 317° F. for 45 minutes. The resultant product meets all of the NEMA requirements for XXXP grade laminate, as will be seen hereinbelow.

The conventional process for producing this grade of laminate involves two stage impregnation. In the first pass or stage, the cotton linter paper is impregnated with a water-alcohol solution of Bakelite resin BLL-3913 having a resin content of 20 percent, and cured to "B" stage by oven heating. The "B" stage product is then saturated with Barretts' Plaskon V-248 spirit soluble resin having a resin content of 60 percent as the second pass and cured to "B" stage by oven heating at 320° F. for 1 ½ minutes. The two step laminate, was piled up and cured to "C" stage identically with the laminate described above. Comparison of these two laminates with each other and the NEMA standards for XXXP grade laminates is as follows:

Table 1

| | This Invention | NEMA Standard | Two stage Laminate |
|---|---|---|---|
| Compressive | | | |

| | | | |
|---|---|---|---|
| strength (p.s.i.) | 40,500 | | 34,200 |
| Flexural strength (p.s.i.) | | | |
| lengthwise | 22,000 | 12,000 min. | 18,000 |
| crosswise | 18,000 | 10,000 min. | 13,800 |
| Water absorption (%) | 0.4 | 1.0 max. | 0.4 |
| Cold Flow (%) | 0.1 | | 0.27 |
| Cold Flow plus shrinkage (%) | 0.5 | | 0.79 |
| Arc resistance (sec.) | 115 | | 40 |
| Dissipation factor at 1 M.C. | | | |
| Condition A | 0.029 | 0.035 max. | 0.023 |
| Condition D/24/23 | 0.033 | 0.035 max. | 0.031 |
| Dielectric constant at 1 M.C. | | | |
| Condition A | 4.0 | 4.6 max. | 4.1 |
| Condition D/24/23 | 4.4 | 4.8 max. | 4.1 |
| ASTM Taper Pin Insulation Resistance (megohms) | | | |
| C/96/35/90 | 40,000 | | 21,000 |
| Dielectric breakdown parallel to lamination | | | |
| Condition A | 100+ | 60 min. | 100+ |
| Condition D/48/50KV | 90 | 15 min. | 50+ |
| Dissipation factor (60 cycle) | 0.6 | | 1.5 |
| Trichlorethylene vapors for 15 minutes | no effect | | no effect |
| ASTM flame out time (sec.) | 20 | | burns |

EXAMPLE 3

Using the resin of example 1, alpha wood pulp paper 0.015 inch thick was saturated to a resin content of approximately 40 percent. The "B" stage was cured at 320° F. for two minutes to a flow test of 5 percent. The NEMA XX grade laminate pressed at 1,500 p.s.i. and 317° F. for 45 minutes had the following properties in a ¼ thickness:

Table 2

| Invention | This | NEMA Standard |
|---|---|---|
| Compression strength (p.s.i.) | 45,100 | |
| Flexural strength (p.s.i.) | | |
| lengthwise | 27,400 | 15,000 min. |
| crosswise | 20,500 | 14,000 min. |
| Water absorption (%) | 0.3 | 0.85 max. |
| 60 Cycle power factor (%) | | |
| 25° C. | 1.5 | |
| 100° C. | 15 | |
| Dielectric breakdown (KV) | | |
| A | 100 | 40 min. |
| Condition D/48/50 | 10 | 5 min. |
| Izod (ft.-lb./in.) | | |
| lengthwise | 0.59 | 0.40 min. |
| crosswise | 0.50 | 0.35 min. |
| Dielectric constant at 1 M.C. | | |
| Condition D/24/23 | 4.9 | 6.0 max. |
| Dissipation factor at 1 M.C. | 0.048 | 0.050 max. |

EXAMPLE 4

Using the resin of example 1, an 0.006 inch thick rag paper was saturated to a resin content of approximately 60 percent. The "B" stage was cured at 320° F. for 3 minutes to a flow test of 20 percent. The "B" stage was convolutely wound on a mandrel and cured 16 hours in an oven at 235° F. to "C" stage to produce a NEMA XXX grade tube. This grade of tubing conventionally is constructed as epoxy tubing having low 60 cycle power factor at elevated temperature. The tubing of this example is not only less expensive than the conventional epoxy tubing, but displays lower 60 cycle power factor at elevated temperatures, as illustrated in the following table:

Table 3

60 cycle power factor (%)

| | This Invention | Epoxy Tube |
|---|---|---|
| 23° C. | 0.8 | 0.5 |
| 66° C. | 1.4 | 0.6 |
| 100° C. | 2.5 | 3.5 |
| 125° C. | 5.0 | 11.0 |
| 150° C. | 14.0 | 50+ |
| Water absorption (%) | 0.1 | |
| Dielectric breakdown (KV) | 75 | |

EXAMPLE 5

Cotton sheeting of weave count 80 × 80 and weight of 3.7 ounce per yard was saturated with the resin of example 1 to a resin content of approximately 60 percent. The "B" stage was obtained by curing in an oven at 320° F. for 2 ½ minutes. The "B" stage was laminated and cured to "C" stage at 1,500 p.s.i. and 340° F. for 60 minutes. This laminate exceeds NEMA LE standards and is very resistant to change in dimension due to humidity. After 6 weeks at 98 percent R.H. a 3/16 inch thick × 5 inches long specimen only increased in length by 0.0043 inch. Under identical conditions, a laminate made with a conventional phenol formaldehyde resin increases in length by 0.0125 inch The laminate of this example exhibits exceptional dimensional stability of particular interest to manufacturers of air motors and hand tools.

EXAMPLE 6

Using the resin of example 1, a nylon fabric was saturated to a resin content of approximately 55 percent. The "B" stage was obtained by curing at 320° F. for 3 minutes. The "C" stage laminate was obtained by curing at 1,000 p.s.i. and 317° F. for 45 minutes to produce a ⅛ inch thick laminate meeting NEMA N-1 standards and having unusually high flexural strength coupled with high-electrical insulation properties as indicated in the following:

TABLE 4

| | This invention | NEMA N-1 standard |
|---|---|---|
| Water absorption (percent) | 0.1 | 0.4 max. |
| 1 MC dissipation factor cond D48/50 | 0.025 | 0.045 max. |
| 1 MC dielectric constant cond D48/50 | 3.6 | 4.0 max. |
| Flexural strength (psi) | | |
| lengthwise | 18,800 | 10,000 min. |
| crosswise | 17,700 | 9,500 min. |
| Electrical insulation surface resistance (megohms) ASTM cond. C-96/36/90 | 600,000 | 1,000 min. |
| Dielectric breakdown parallel to lamination (KV) Condition D 48/50 | 85 | 40 min. |
| Electrical insulation volume resistivity (megohms) Condition C—6/36/90 | $50 \times 10^6$ | $1 \times 10^9$ min. |

While the preferred molar ratios of aniline/phenol/formaldehyde of 2/7/10.5 was described above, good and useful resins have been made in the range from 2/5-28/7-30. Other basic and amine catalysts have also been useful such as sodium hydroxide and triethanolamine, or catalyst may be dispensed with if loss of efficiency is not a factor.

The "B" staging operation is done in an oven with heat. "B" staging is the operation where the webs of fibers are treated with the resin and semicured or polymerized. In this operation the solvent is removed and also the amount of resin applied to the web is controlled. The "B" staging is done in conventional treating equipment as known to the laminating industry.

Steam, gas and infrared are some of the best heat sources which can be used. While temperatures in the range of 300 to 350° F. for 1 to 10 minutes have produced good "B" stages, other temperature time cycles could be adopted.

The third and final stage, in the production of thermosetting laminates, is called the "C" stage. In this operation, the "B" stage is cut into sheets, sandwiched between press plates and laminated in a press under heat and pressure. Temperatures of 300° to 400° F. and pressures of 50 to 3,000 p.s.i. have been used to produce good laminates. Conventionally, high pressure in the thermosetting laminating industry is considered to be above 1,000 p.s.i. This invention is not limited to high pressure in that good laminates have been made at lower pressures.

Tubing is made by wrapping the "B" stage on a mandrel and curing with heat or other energy source to the "C" stage. Formed or shaped parts can be made in conventional molds under heat and pressure. The finished laminates are tested for quality by standard ASTM methods.

From the above, it will be seen that the resin according to this invention leads to laminated products possessing excellent mechanical and/or electrical properties to meet a wide range of product requirements. In general, the paper base products are characterized by their excellent electrical properties combined with unusual strength in addition to the ability of the resin to effect impregnation in a single stage. The cotton fiber based products exhibit unusual dimensional stability, the rag paper based products exhibit unusual power factor characteristics particularly at elevated temperatures, and the synthetic fiber based products exhibit excellent electrical properties combined with high strength.

Obviously many modifications and variations of the present invention are possible in the light of the above teachings. It is therefore to be understood that within the scope of the appended claims the invention may be practiced otherwise than as specifically described.

What is claimed is:

1. The one-stage impregnation method of making a laminate product which consists of:
   a. reacting a mixture consisting of 2 moles of aniline, about 7 moles of phenol, and about 10.5 moles of formaldehyde under reflux and for a time sufficient to produce a resol which is water soluble to the extent of about 9–12 percent by weight;
   b. separating said resole and adjusting the water content of said resol to about 9–12 percent water by weight;
   c. adding a solvent to said resol in amount to provide about 50 percent by weight total solids;
   d. impregnating a layer of cellulosic fibrous material with the dilute resol of step (c);
   e. evaporating the solvent and curing the resol in the impregnated layer to B-stage by the application of heat;
   f. superimposing layers of impregnated material cured as in step (c) to provide an uncured laminate, and
   g. curing the B-stage resin in the laminate of step (f) with under heat and pressure to C-stage.